2,766,732

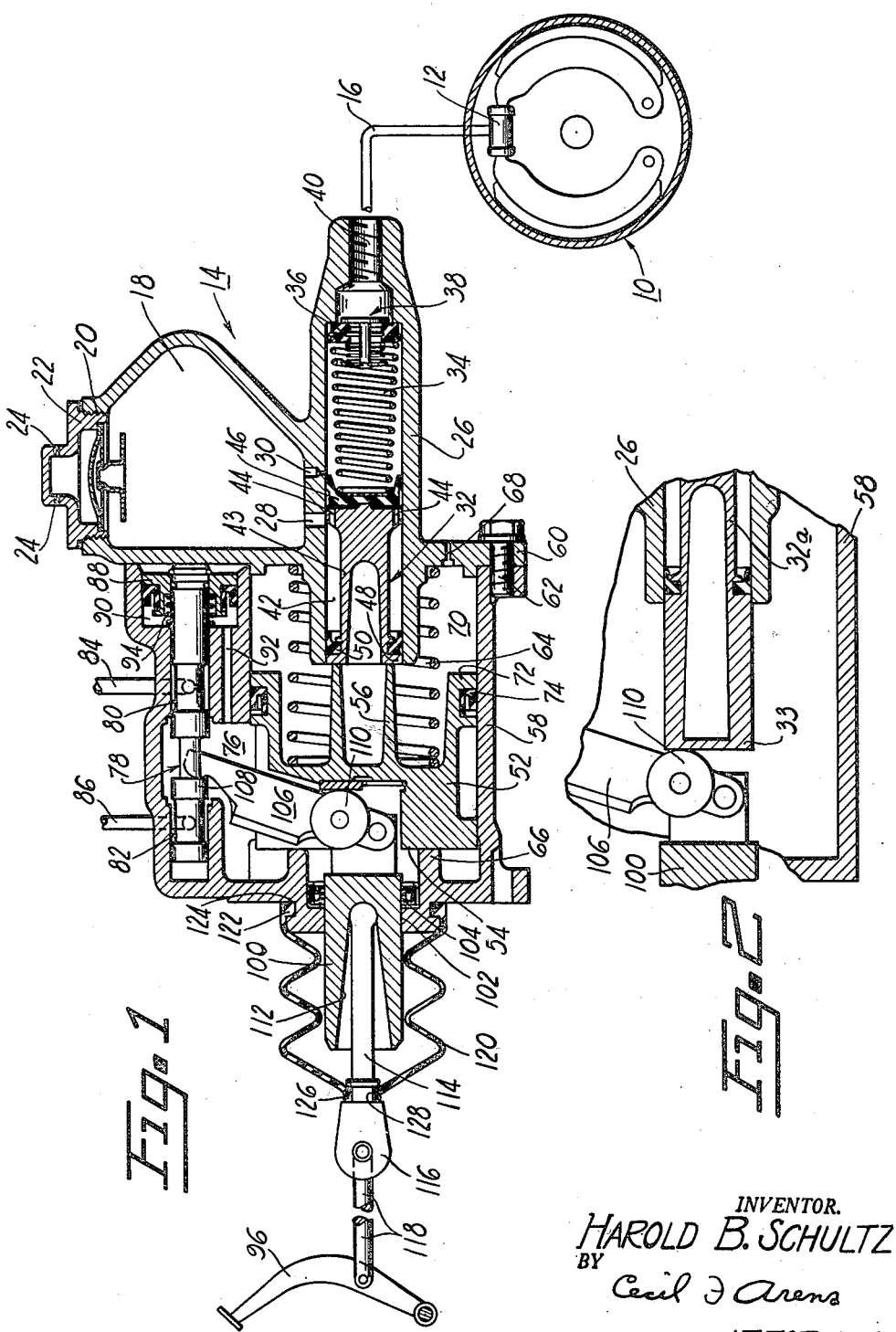
Oct. 16, 1956     H. B. SCHULTZ     2,766,732
MASTER CYLINDER
Filed March 21, 1950
INVENTOR.
HAROLD B. SCHULTZ
BY
Cecil J Arens
ATTORNEY United States Patent Office 2,766,732
Patented Oct. 16, 1956

MASTER CYLINDER

Harold B. Schultz, South Bend, Ind., assignor to Bendix Aviation Corporation, South Bend, Ind., a corporation of Delaware Application March 21, 1950, Serial No. 150,915

3 Claims. (Cl. 121—41)

This invention relates to master cylinders for hydraulic brakes.

It is an object of this invention to provide a novel power operated master cylinder.

Another object of the invention resides in the provision of an improved hydraulic servo master cylinder for use in braking systems.

A still further object of the invention is to provide a power operated master cylinder wherein the valve actuating lever is fulcrumed on the piston.

A very important object of the invention is to provide a power actuated master cylinder wherein the control valve, piston, and actuating lever are contained within the same housing.

The above and other objects and features of the invention will be apparent from the following description of the apparatus taken in connection with the accompanying drawings in which:

Figure 1 is a view in section of the device of the invention, associated with a braking system; and Figure 2 is a diagrammatic representation of a modified form of the device of Figure 1.

Referring now to the drawings the reference numeral 10 designates a brake assembly including a wheel cylinder 12 connected to a master cylinder 14 via a pipe line 16.

The master cylinder comprises a reservoir 18 having a filling opening 20, which may be closed by a plug 22, equipped with passages 24 for properly venting the reservoir to atmosphere. A cylinder 26 is formed at the bottom of the reservoir and communicates therewith through ports 28 and 30.

A piston 32 is slidably located in the cylinder 26 and is normally urged toward one end by a spring 34 interposed between the piston and an element 36 of a double acting check valve 38, carried in the other end of the cylinder adjacent discharge port 40, with which the pipe line 16 is in communication. The piston is urged toward the other end of the cylinder by a variable pressure in a manner to be hereinafter described. It is a function of the check valve to maintain a slight positive or residual pressure in the system, including the hydraulically actuated wheel cylinders 12, only one of which is shown. In retracted position, that is, when the piston 32 is urged toward one end of the cylinder, as shown in the drawing, the reservoir 18 is in direct communication with the forward or other end of the cylinder via the port 30. Port 28 communicates the reservoir with an annular chamber 42, formed between a reduced section 43 of the piston and the wall of the cylinder. Passages 44 in the forward end of the piston 32 connect the said other end of the cylinder 26 to the reservoir, by way of the annular chamber 42, and the port 28. The face of the piston is provided with a flexible sealing cup 46 which controls the passages 44 so that when the piston is in retracted position the spring 34 holds the cup tightly against the passages; but when the piston is being returned to its retracted position, under the influence of the spring, a low pressure is developed in said other end of the cylinder with respect to the reservoir, which is under atmospheric pressure, thus forcing the flexible cup away from the passages to thereby permit fluid to pass from the reservoir to the right end of the cylinder. The end of the piston opposite the sealing cup 46 is equipped with a skirt 48 which carries a leak-proof seal 50, for preventing seepage of fluid from the cylinder past the left end piston.

In order to obtain the braking force necessary in the system shown, a booster device is used and includes a piston 52 having an enlarged end 54, on which fluid under pressure acts. The piston 52 is coextensive with the piston 32 and is formed with a tubular extension 56 which abuts the apron 48 of the piston 32. The pistons could just as well be integral insofar as the invention is concerned, and they will be so considered, but for manufacturing reasons and for the purpose of exemplification the pistons are shown as individual members. This feature is a matter of design only and forms no part of the invention. In fact, were it not for the high pressure requirements of the system the single piston 32 with its relatively small area would suffice. See Figure 2, wherein piston 32a is provided with an extension 33 which terminates adjacent the inner end of the plunger 100. The piston 52 is slidably housed in a casing 58 securely fastened to a flange 60, of cylinder 26, by bolts 62, only one of which is shown. A spring 64 is interposed between the piston 52 and the flange 60 for normally retaining the piston in abutting relationship to the annular extension 66 projecting inwardly from the end of the casing. A passage 68 in the flange 60, communicates chamber 70, formed in the casing 58 between the forward end of the piston 52 and the flange, with the atmosphere. The piston 52 is provided with a skirt 72 which carries a leak-proof washer 74 to prevent the leakage of oil from pressure chamber 76 to the chamber 70.

A slide valve 78 controls the variable oil pressure in chamber 76. This valve is slidably disposed in cylindrically formed opposed chambers 80 and 82 with which inlet and outlet pipe lines 84 and 86 respectively communicate. One end of the slide valve is equipped with an enlarged head member 88 which slides in chamber 90. The latter chamber is connected to the pressure chamber 76, by a passage 92. A spring 94 is interposed between the enlarged head 88 and the casing for biasing the slide valve to cut off position, as shown in Figure 1 of the drawing, wherein free communication is established between the outlet 86 and the chamber 76 and cut off between that chamber and the inlet pipe line. It will be noted that the fluid pressure in chamber 76 acts on the enlarged head 88 tending to move the valve to closed position. This action of the fluid pressure on the valve produces the "feel" required for power braking. That is, the force acting on the valve tending to close the same is proportional to the operator's force applied to pedal 96 tending to move the slide valve to open position.

A valve actuating mechanism is interconnected between the pedal 96 and the slide valve for controlling the latter. This mechanism comprises a plunger 100 slidably carried in an opening 102 at one end of the casing 58. A sealing cup 104, located adjacent the opening 102, wipes the plunger during its sliding action. A lever 106, pivotally supported on the inner end of the plunger 100, is fulcrumed on the back side of piston 52, and has its free end in engagement with an enlarged section 108 of the slide valve. The side of the enlarged section 108, opposite the end of the lever 106, slides into the chamber 82 for controlling the exhaust of fluid to pipe line 86. The fulcrum of the lever 106 is provided by a roller element 110 pivotally carried on the lever so that the periphery of the roller rides against the back side of the piston 52.

The plunger 100 is formed with a recess 112, into which a thrust pin 114 fits for limited swiveling action. The outer end of the thrust pin 114 is equipped with a link 116. A tie rod 118 connects the pedal 96 to the link 116.

In order to preclude dust particles and other foreign materials from the walls of the plunger 100, and opening 102, a flexible cylindrical boot 120 is provided, one end of which is formed with a bead 122 for engagement with groove 124, of the casing, the other end of the boot is provided with a similarly constructed bead 126, of smaller diameter, for engagement with groove 128 of the thrust pin 114.

Aside from the "feel" created with the employment of the enlarged head member 88, additional "feel" is obtained by subjecting the right end of plunger 100 to the pressure in chamber 76. This device also has "position sense." That is, each movement of the piston represents a certain movement of the brake shoes, thus enabling the operator to ascertain with a fair degree of accuracy the extent or amount of braking available if and when needed.

Operation of the power operated master cylinder is as follows: assume that the braking system, including the reservoir 18 is properly filled with oil, and the pipe lines 84 and 86 are connected to a source of fluid under pressure, not shown.

When it is desired to apply the brakes, pedal 96 is depressed, this moves the plunger 100 forward which in turn urges roller 110 against the back end of the piston, thus tending to impart axial movement thereto and accordingly pressurize the fluid in line 16 of the braking system. However, instead of actually manually moving the piston at this time the lever 106 is rotated about the roller 110 as a fulcrum, thus sliding the valve 78 to the left, to thereby close communication between the exhaust 86 and the chamber 76, and establish communication between the latter and inlet 84. The fluid under pressure which is admitted to chamber 76 acts on the enlarged area of the piston, causing it to move to the right to thereby compress the fluid in the brake line. This movement of the piston to the right allows the lever 106 to rotate clockwise, hence permitting the slide valve to be closed under the influence of the spring 94, and the pressure acting on the head 88 of the valve. Subsequent movement of the plunger 100 again slides the valve 78 to the left, admitting fluid under pressure to the chamber 76, thus causing further movement of the piston to the right and increasing the brake applying force in the system. This movement of the piston to the right once again allows the lever 106 to rotate clockwise, whereby the slide valve is closed. This cycle is repeated each time a new force is applied to the pedal 96.

The force required at the pedal 96 for initiating a power brake application depends upon the relative strength of the springs 34, 64 and 94, and the proportionate amount of the force transmitted to the valve 78 through the lever 106. The reaction to the pedal force, tending to move the piston to the right, is taken in the casing 58 by way of the slide valve 78 and spring 94. Upon the admission of fluid under pressure to chamber 76, the reaction produced by spring 94 is enhanced by the pressure fluid acting on the head 88 of the slide valve and on the end of plunger 100. A substantial amount of the force applied at the pedal 96 is imparted directly to the piston.

In the event of fluid pressure failure for moving the piston, the braking system can be pressurized by the application of a force to the pedal 96 in the same manner as for power operation. In the case of manual braking the slide valve 78 is bottomed at the left end of the chamber 82 with the fulcrum of the lever 106 now being at the free end, where the lever rides on the enlarged section 108.

Although this invention has been described in connection with certain specific embodiments, the principles are susceptible of numerous other applications that will readily occur to persons skilled in the art.

Having thus described the various features of the invention, what I claim as new and desire by Letters Patent is:

1. A fluid pressure producing device including a housing, a piston reciprocable therein, means urging the piston toward one end of the housing, a discharge port in the other end of the housing, a manually movable plunger slidably supported adjacent one end of the piston for moving the same toward the other end of the housing, the adjacent ends of said plunger and piston being housed in a common chamber subjected to a variable pressure which moves said piston toward the other end of the housing and opposes manual movement of the plunger, a valve in the chamber connectible to a pressure source and normally urged toward closed position, and a lever mounted at one end on the plunger with the other end of the lever operatively connected to said valve for controlling the pressure in said chamber, said lever abutting the piston intermediate the ends of the lever to provide a fulcrum therefor for moving the valve to open position and also a driving connection to said piston, movement of the piston toward said other end of the housing under the influence of the variable pressure tending to remove the fulcrum and break the driving connection.

2. A fluid pressure producing device including a housing, a piston reciprocable therein, means urging said piston toward one end of the housing, said piston being urged during its entire movement toward the other end of the housing by a variable fluid pressure, a discharge port in said other end of the housing, and means for controlling the variable pressure including an operator operated plunger, a valve openable upon application of a predetermined force to said plunger, said valve and said plunger having parts so proportioned with respect to each other that the variable pressure acts thereon with a force having a definite relationship to said predetermined force in a direction opposing the latter whereby "feel" is obtained, said means for controlling the variable pressure also including a lever operatively connected at its ends to said valve and plunger respectively and having driving contact with said piston, movement of said piston under the influence of said variable pressure tending to cause contact to be broken between said piston and said means for controlling the variable pressure.

3. A fluid pressure producing device including a housing, piston means reciprocable therein, means urging the piston means toward one end of the housing, said piston means being urged toward the other end of the housing by a variable pressure, a discharge port in the other end of the housing, means for controlling the variable pressure including a plunger spaced apart from the piston means, a valve openable upon movement of said plunger toward the piston means, said variable pressure opposing movement of said plunger and a lever pivotally carried at its one end by said end of the plunger, said lever having a fulcrum on said piston means and its other end operatively engaging the valve, said fulcrum providing driving contact between the plunger and piston means, which contact tends to be disestablished upon movement of the piston means toward the other end of the housing under the action of the variable pressure.

References Cited in the file of this patent

UNITED STATES PATENTS

| 2,229,247 | Kamenarovic | Jan. 21, 1941 |
| 2,292,916 | Wheelon | Aug. 11, 1942 |
| 2,395,223 | Ingres | Feb. 19, 1946 |
| 2,464,367 | Balogh et al. | Mar. 15, 1949 |

FOREIGN PATENTS

| 626,980 | France | May 8, 1927 |
| 919,427 | France | Nov. 25, 1946 |